United States Patent [19]

Shortridge

[11] Patent Number: 4,481,829
[45] Date of Patent: Nov. 13, 1984

[54] MANIFOLD APPARATUS FOR AIRFLOW SENSING EQUIPMENT

[76] Inventor: Ernest R. Shortridge, 5024 E. Desert Park La., Paradise Valley, Ariz. 85253

[21] Appl. No.: 463,028

[22] Filed: Feb. 1, 1983

[51] Int. Cl.³ .............................................. G01F 1/46
[52] U.S. Cl. .................................................. 73/861.66
[58] Field of Search ........... 73/861.61, 861.65, 861.66, 73/861.67

[56] References Cited

U.S. PATENT DOCUMENTS

| | | | |
|---|---|---|---|
| 1,250,238 | 12/1917 | Spitzglass | 73/861.66 |
| 1,645,449 | 10/1927 | Proebstel | 73/861.66 |
| 2,614,423 | 10/1952 | Carbone | 73/861.61 |
| 3,981,193 | 9/1976 | Goulet | 73/861.66 |
| 4,290,315 | 9/1981 | Groberg | 73/861.61 |

Primary Examiner—Herbert Goldstein
Attorney, Agent, or Firm—H. Gordon Shields

[57] ABSTRACT

Manifold apparatus for air sensing equipment includes a pair of separate but parallel tubular manifolds, and apertures communicating with the interior of the manifolds are disposed in a predetermined pattern for sensing and averaging the airflow. An apertured plate may be placed over the manifolds to provide a predetermined apparent increase in the flow to the manifold which enables very low flow rates to be measured.

21 Claims, 18 Drawing Figures

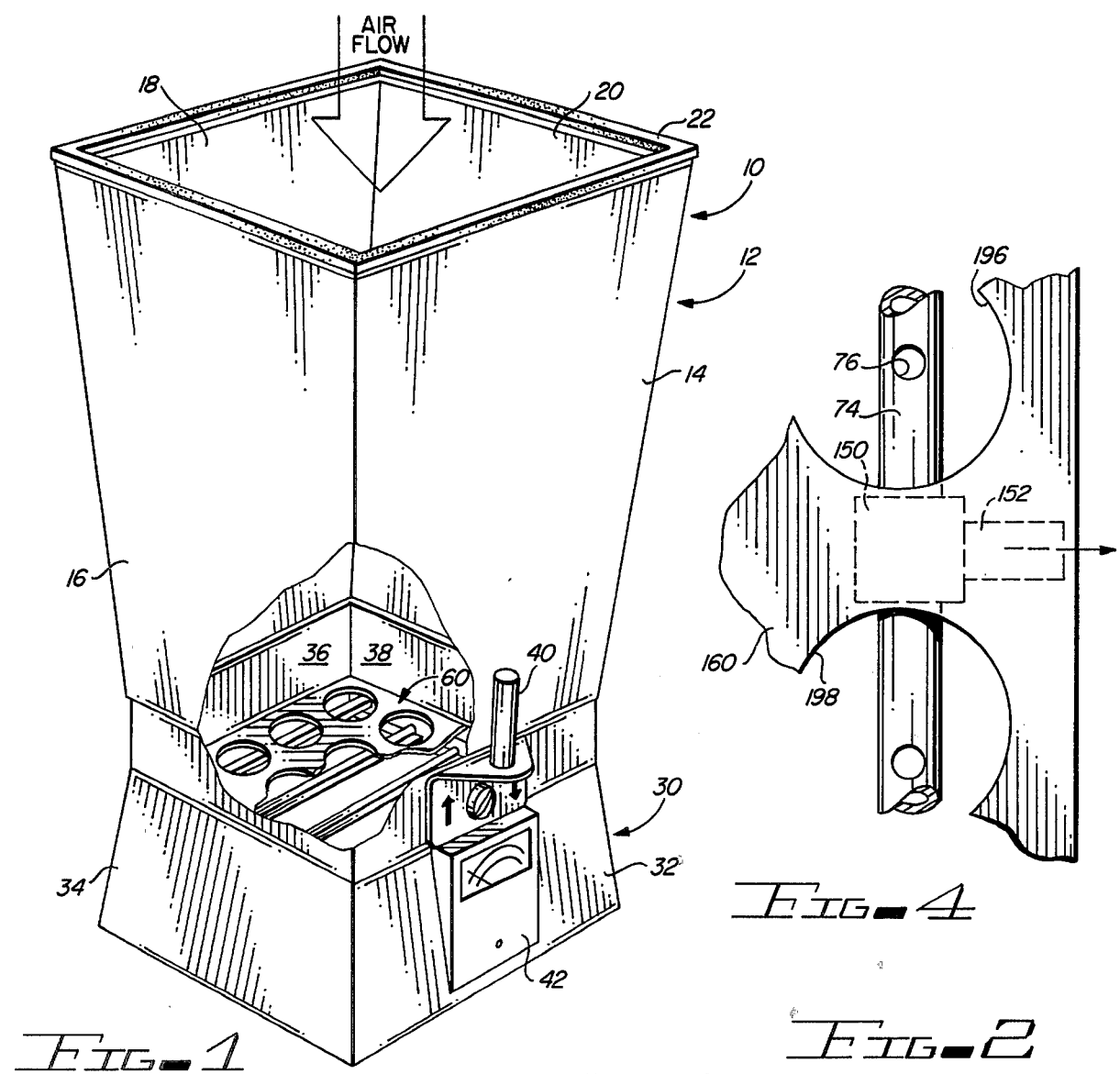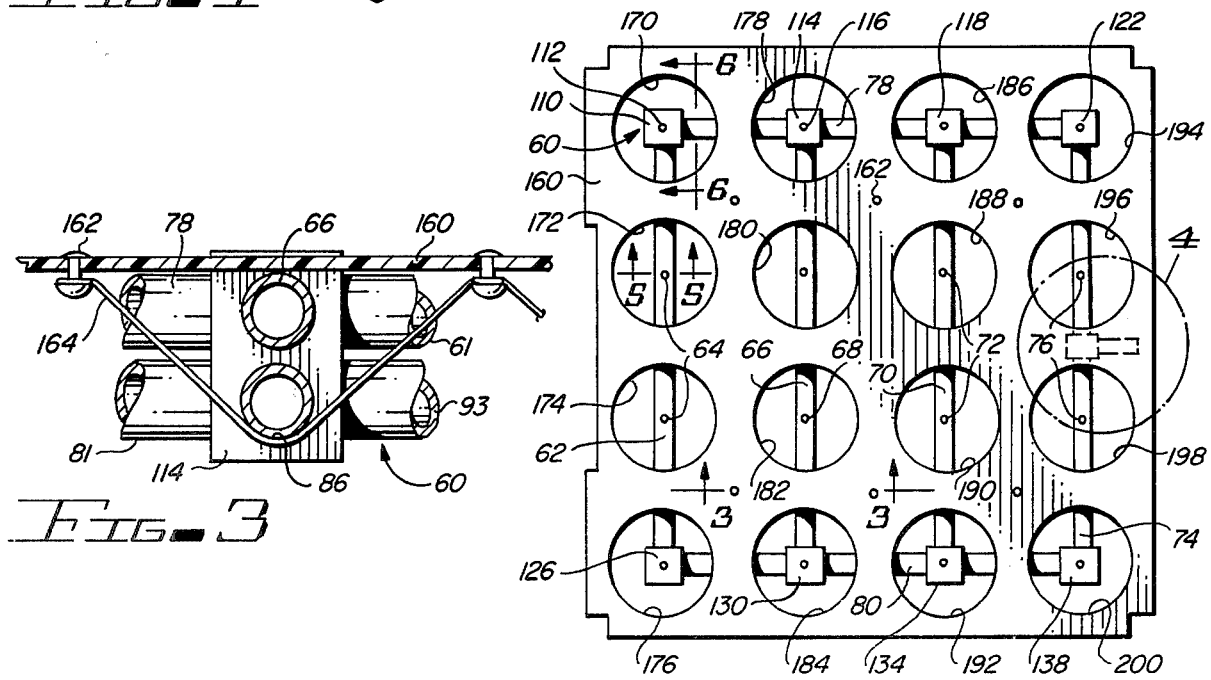

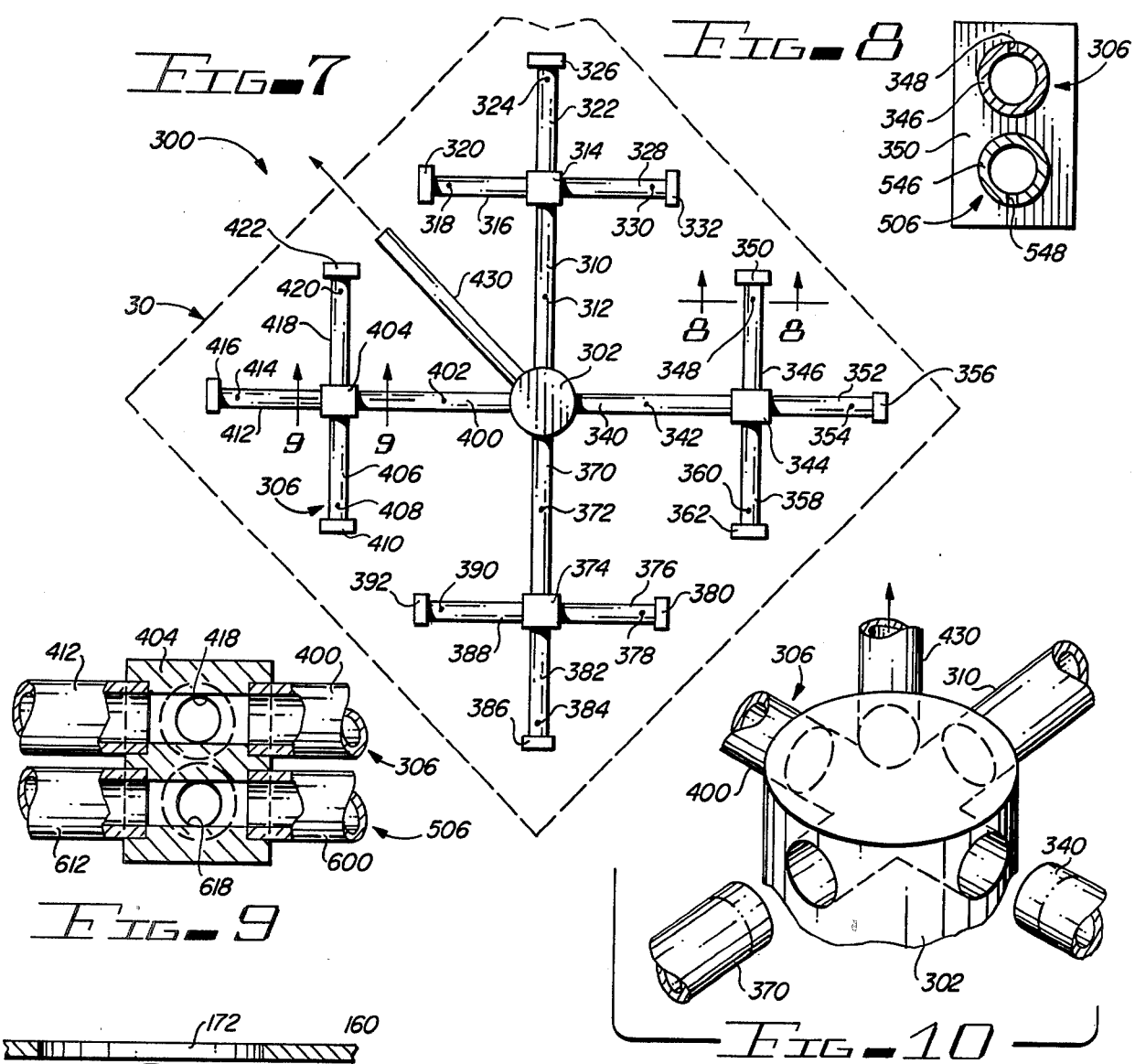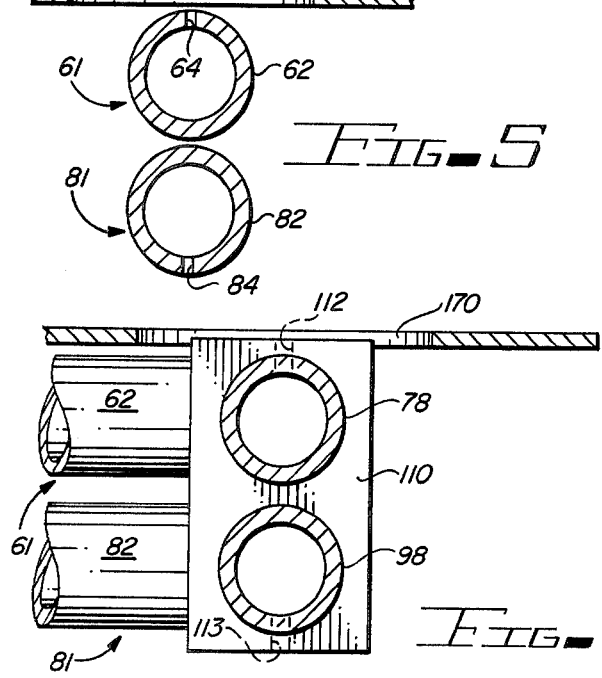

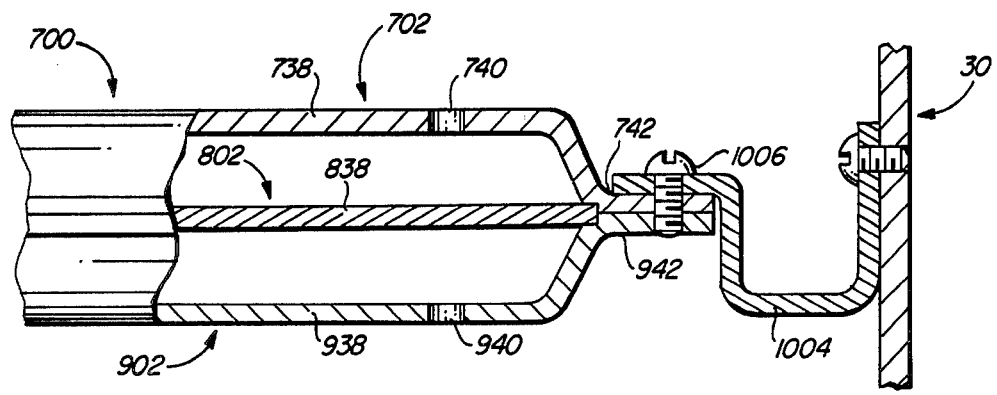
_Fig-14_
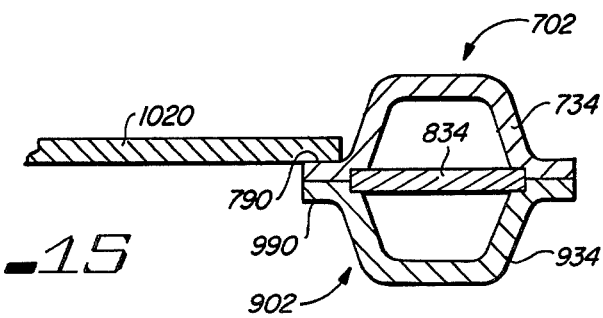
_Fig-15_
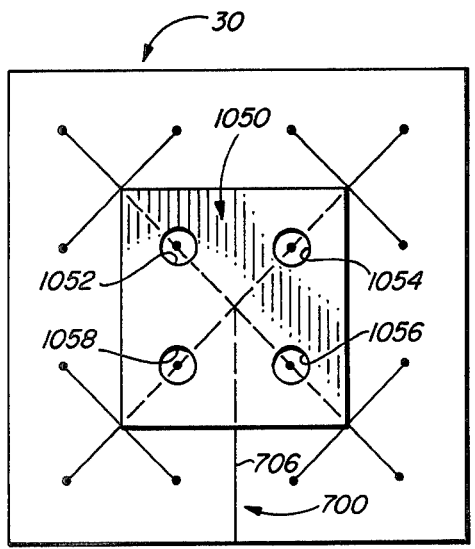
_Fig-16_
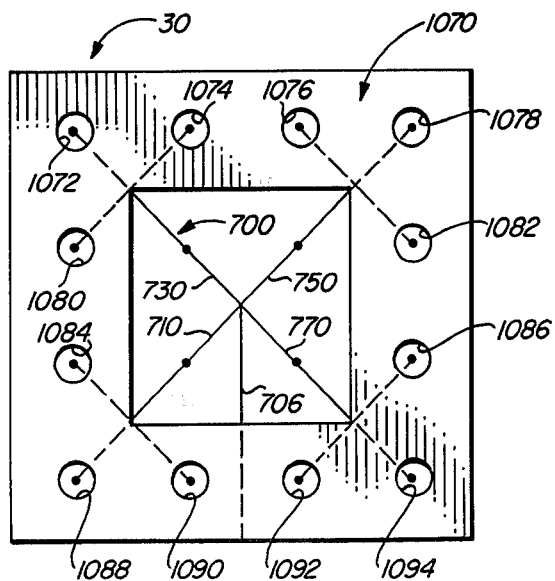
_Fig-17_

MANIFOLD APPARATUS FOR AIRFLOW SENSING EQUIPMENT

BACKGROUND OF THE INVENTION

1. Field of the Invention

The present invention pertains to manifold apparatus for sensing airflow, and, more particularly, to the sensing of airflow in a duct or controlled space utilizing a double manifold system.

2. Description of the Prior Art

The balancing of air duct systems used for heating and cooling purposes requires the measurement of air flows from duct outlets and inlets. The measurements are necessary in order to appropriately balance the airflow throughout the system. This may be accomplished by having some type of airflow sensing system installed permanently in a duct, or at several locations in a duct, or it may be accomplished by utilizing a portable sensor system. Most often, a portable airflow sensor system includes a hood which is disposed about the airflow outlet and which captures all of the airflow through the outlet or inlet and which directs the airflow through or across appropriate sensing apparatus where the airflow is measured.

Two measurements are generally taken of the flowing air. One measurement is that of the total pressure and the second measurement is static air pressure. The two measurements are then utilized to indicate the differential pressure, which represents the velocity pressure of the airflow. That is, the static pressure is subtracted from the total pressure to determine the differential pressure, which is velocity pressure of the airflow at the controlled environment of the sensor system.

It will be understood that while the present specification discusses air measurements in terms of pressure, pressures are or may be correlated to airflows, and thus meter readings are typically in CFM (cubic feet per minute) or any other unit of volumetric flow. Various other means may also be used to derive outlet flows being measured.

Since air duct outlets typically include diffusers for directing the air outwardly in a controlled manner, and the hood attempts to confine all of the airflow, even though it is directed in a plurality of different directions, the airflow in the hood is not in a laminar form. That is, the flow of air may be different at different locations within the hood. Moreover, turbulence, etc., may also be present within the hood. Accordingly, it is desirable to average the air velocities to provide a composite total of the flow of air.

Prior art devices typically include only a manifold disposed at the inner periphery of the flow sensing section, assuming that the flow at this inner peripheral area provides an averaging indication. However, such is not the case.

Another problem inherent in the prior art apparatus is the lack of ability to sense air velocities below about fifty feet per minute. The sensing of relatively low air velocity is difficult due to the relatively low velocity pressure, which is the difference between the total pressure and the static pressure, and the ability of instruments to accurately take readings at such low velocities and to provide accurate results from the sensing of the two pressures.

The apparatus of the present invention allows air at low flow rates to be sensed by providing a multiplier by using an apertured plate in conjunction with a manifold. The apertured plate provides a known net area or multiplier factor, thus enabling relatively low flow rates to be accurately measured.

SUMMARY OF THE INVENTION

Airflow sensing manifold apparatus comprises a pair of tubular or dual chambered manifolds oriented parallel to each other and both disposed substantially perpendicular or normal to the flow of air through a controlled space and through apertures communicating with the manifolds for sensing in one manifold total air pressure and in the other manifold static air pressure, with the apertures in one manifold disposed 180° apart from the apertures in the other manifold. The apertures are spaced apart from each other in a regular, predetermined fashion to provide equal spacing throughout the cross-sectional area of a duct to provide an equal sampling of the air velocity or flow. An apertured plate is disposed over the manifold to provide a predetermined multiplier to allow for the sensing of relatively low air velocities.

Among the objects of the present invention are the following:

To provide new and useful manifold apparatus for determining airflow;

To provide new and useful manifold apparatus for sensing air pressure;

To provide new and useful manifold apparatus having a pair of manifolds, with one manifold sensing static pressure combined with pressure due to the flow of air and the second manifold sensing static air pressure only;

To provide new and useful apparatus for amplifying by a predetermined amount the flow of air through or the differential pressure of a tubular manifold apparatus; and To provide new and useful manifold apparatus having a plurality of predetermined holes communicating with the interior of the manifolds for sensing air pressure throughout a crosssectional area of a controlled air duct.

BRIEF DESCRIPTION OF THE DRAWING

FIG. 1 is a perspective view of manifold apparatus of the present invention.

FIG. 2 is a top view of the apparatus of the present invention.

FIG. 3 is a view in partial section of a portion of the apparatus of the present invention, taken generally along line 3—3 of FIG. 2.

FIG. 4 is an enlarged view of a portion of the apparatus of the present invention, taken generally from circle 4 of FIG. 2.

FIG. 5 is a view in partial section of a portion of the present invention taken generally along line 6—6 of FIG. 2.

FIG. 6 is a view in partial section of a portion of the present invention taken generally along line 6—6 of FIG. 2.

FIG. 7 is a top view of an alternate embodiment of a portion of the apparatus of the present invention.

FIG. 8 is a view in partial section of a portion of the apparatus of FIG. 7, taken generally along line 8—8 of FIG. 7.

FIG. 9 is a view in partial section of a portion of the apparatus of FIG. 7, taken generally along line 9—9 of FIG. 7.

FIG. 10 is an enlarged perspective view, partially exploded, of a portion of the apparatus of FIG. 7.

FIG. 14 is a view in partial section taken along line 14—14 of FIG. 11.

FIG. 15 is a view in partial section taken generally along line 15—15 of FIG. 11.

FIG. 16 is a schematic top plan view of an alternate embodiment of the present invention.

FIG. 17 is a schematic top plan view of another alternate embodiment of the present invention.

FIG. 18 is a front view of a portion of the apparatus shown in FIG. 1.

DESCRIPTION OF THE PREFERRED EMBODIMENT

Figure 11:
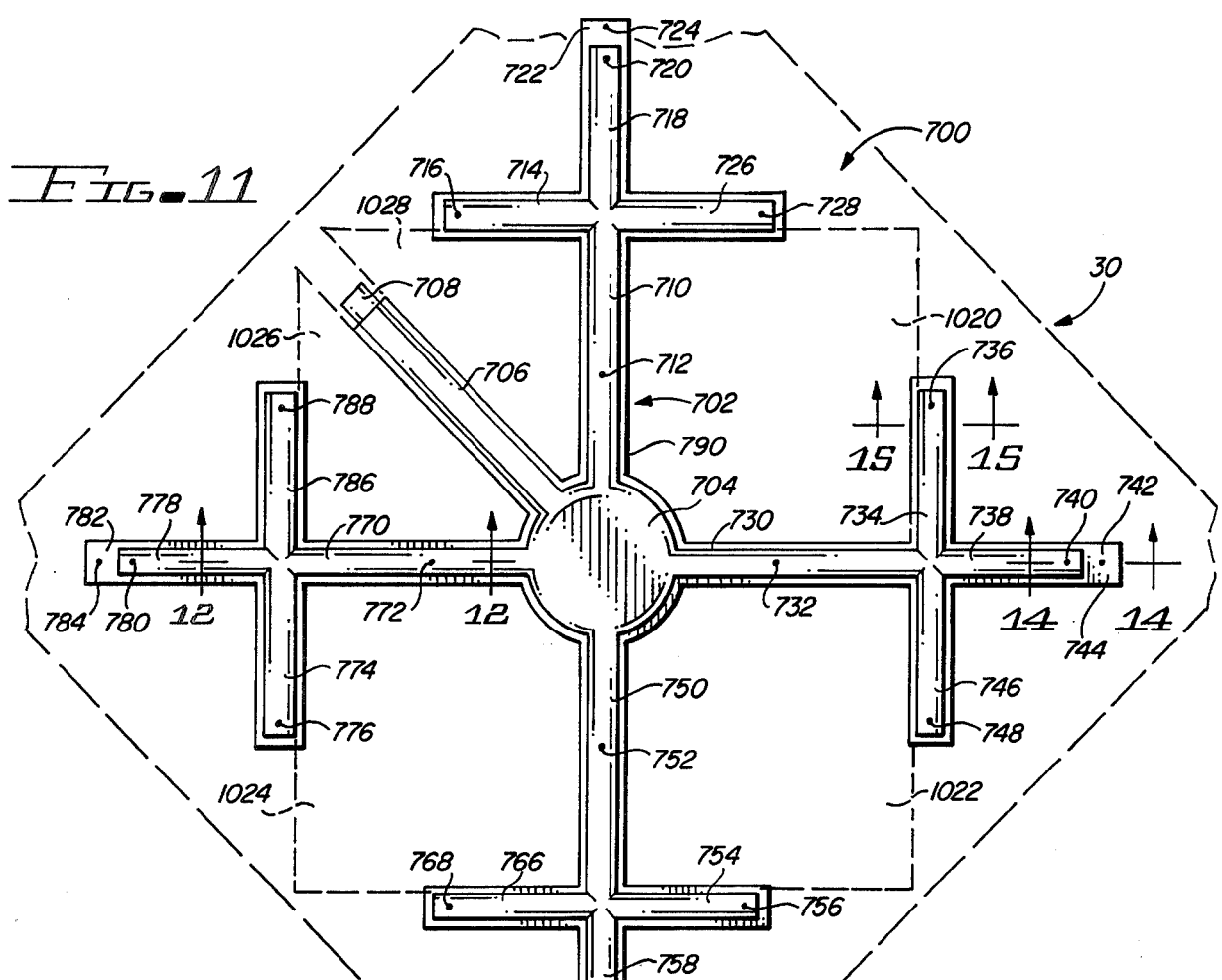
FIG. 11 is a plan view of an alternate embodiment of the apparatus of FIGS. 7-10.

FIG. 1 is a perspective view of airflow measurement apparatus 10. A portion of FIG. 1 is cut away to reveal elements disposed within the apparatus. FIG. 2 is a top view of a portion of the airflow apparatus 10. FIG. 3 is a view in partial section of a portion of the airflow measurement apparatus 10 taken generally along line 3—3 of FIG. 2. FIG. 4 is an enlarged fragmentary view of a portion of the airflow measurement apparatus 10 taken generally from circle 4 of FIG. 2. FIGS. 5 and 6 are views in partial section of a portion of airflow measurement apparatus 10 taken generally along lines 5—5 and 6—6 of FIG. 2, respectively. For the following discussion, reference will primarily be made to FIGS. 1-6.

Airflow measuring apparatus 10 includes an air funnel 12 disposed above, and extending upwardly from, a base 30. The air funnel 12 includes appropriate support elements, not shown, which are secured to the base 30 and which provide support for four wall panels 14, 16, 18, and 20. The wall panels 14 . . . 20 are preferably made of lightweight, close-weave material, such as nylon cloth. The panels provide a funnel effect for air flowing through the funnel 12 to and through the base 30. The tight weave for the material out of which the funnel walls are made directs the airflow toward the base 30 and permits or allows minimal escape of air outwardly through the panels.

A sealing gasket 22 extends about the periphery of the air funnel 12. The sealing gasket permits the funnel 12 and the airflow measurement apparatus 10 to be disposed against a ceiling panel and about an air duct or vent so that the airflow through the vent or duct is directed through the apparatus 10 for measurement purposes.

The base 30 includes four sides, including side 32, a side 34, a side 36, and a side 38. The sides are disposed substantially perpendicularly to each other.

A handle 40 is appropriately secured to a bracket on the upper portion of the side 32. A meter 42 is also secured to the side 32. For convenience, the side 32 may be referred to as the "front" side of the apparatus, due to the presence of the handle 40 and the meter 42.

As may be seen best from FIG. 1, the four sides of the base 30 include two portions, an upper portion and a lower portion. The upper portion of the base is relatively short in overall height. It extends in a relatively square, box-like configuration. The lower portion of the base extends outwardly and downwardly, away from the upper, box-like portion.

The air funnel 12 extends upwardly and outwardly from the upper portion of the base 30. Accordingly, the perimeter of the upper portion of the air funnel 12, at the sealing gasket 22, is greater than the perimeter of the upper portion of the base 30 and also slightly greater than the outer perimeter of the lower portion of the base 30. It will be understood that the bottom of the base 30 is open. The air funnel 12 and the base 30 define a relatively open or hollow element, adapted to receive airflow at one end of the apparatus 10 and adapted to allow the air to flow out at the other end of the apparatus. The funnel 12 and base 30 comprise an air duct through which air flows from a supply duct or to a return duct and in which airflow is measured.

While a generally square cross-sectional funnel 12 is illustrated in FIG. 1, it will be understood that rectangular or other shaped funnels of various sizes may be secured to the base 30. The size and configuration of a funnel depends on the size or shape of a particular outlet or inlet. Thus, a typical airflow measuring system will include a single base 30 but a plurality of funnels 12 of different sizes and shapes to fit most of the more popular sized outlets/inlets.

Disposed within the base 30, and generally supported within the cross-sectional area of the base 30, is a manifold or grid 60. The manifold or grid 60 is a double tubular manifold, or a pair of tubular manifolds, disposed one above the other. The manifold 60 is in a generally rectangular configuration with its tubular elements or runners disposed substantially parallel and perpendicular to the four sides of the base 30.

The manifold 60 comprises a pair of parallel manifolds, each of which is substantially identical to the other. The manifolds are of a generally rectangular configuration, each composed of a plurality of manifold runners which are hollow tubular elements and which are connected together. The upper manifold is designated by reference numeral 61, and the lower manifold is designated by reference numeral 81. The two manifolds 61 and 81, or portions thereof, are best shown in FIGS. 3, 5, and 6. With air flowing downwardly, as indicated by the large arrow in FIG. 1, the upper manifold 61 is used to sense the total pressure of the flowing air, or the airflow downwardly through the air funnel 12 from a duct or outlet. The manifold 81 is used to sense static air pressure.

Openings or apertures in the manifold 61 extend or face upwardly, or are on the top of the manifold, with respect to the apparatus 10 of FIG. 1, and of the other Figures, while apertures or openings in the manifold 81 extend or face downwardly, or are on the bottom of the manifold, away from the airflow through the apparatus 10. This is best illustrated in conjunction with FIGS. 5 and 6, and will be discussed more in detail below.

The "up" facing apertures are open to the total pressure of the flowing air, while the "down" facing apertures are open to static pressure. Since the total pressure is the sum of the static pressure and the velocity pressure, it follows that velocity pressure is the difference between total pressure and static pressure, and hence the need to sense static pressure. Static pressure is actually pressure normal or perpendicular to the flow. Accordingly, the static pressure discussed herein is technically not static pressure, but is actually lee side pressure. The lee side pressure is a lower pressure than actual static pressure. However, for practical purposes herein, the lee side pressure is considered to be static pressure.

The upper manifold 61 comprises a rectangular manifold array including four parallel manifold runners or elements 62, 66, 70, and 74. The manifold elements or runners 62 . . . 74 are generally parallel to each other and are equally spaced apart. They are joined at their outer ends by another pair of manifold runners 78 and 80, respectivly. The manifold runners 62, 74, 78, and 80 define a square, with the manifold runners 66 and 70 disposed within the square.

The manifold runner 62 includes a plurality of apertures or holes 64 which extend downwardly from the top of the runner 62 and communicate with the interior of the hollow manifold runner. Similarly, the manifold runner 66 includes a plurality of holes or apertures 68 which are generally parallel to the aperture 64. The runner 70 includes a plurality of apertures 72, and the runner 74 includes a plurality of apertures 76. The holes or apertures 64, 68, 72, and 76 are aligned parallel with each other.

At the corners and junctures of the manifold runners there are blocks to which the runners are connected. At the juncture of the manifold elements 62, 66, 70, and 74, with the manifold runner 78, there are four blocks 110, 114, 118, and 122. At the juncture of the runners 62, 66, 70, and 74 with the manifold runner 80 are blocks 118, 130, 134, and 138. Each of the blocks includes a hole or aperture which extends into the block. The apertures or holes provide substantially the same function as do the holes 64, 68, 72, and 76. The blocks 110 . . . 138 simply comprise juncture elements for securing the various manifold elements together. The holes or apertures extending into the blocks, and the holes or apertures extending into the runners, simply provide for the communication of pressure, as defined by the flow of air moving over the manifold, into the manifold itself.

As shown in FIG. 2, the block 112 includes an aperture 112, and the block 114 includes an aperture 116. The apertures are centrally located with respect to the blocks. The other blocks each have similar holes or apertures.

The upper manifold 61 is shown in FIG. 2, and, as stated above, the lower, or static manifold 81 is substantially parallel to and aligned with manifold 61. The manifold 81 is shown only in part in FIGS. 3, 5, and 6. In FIG. 3, the lower manifold 81 is shown with two of its manifold runners 86 and 93, both of which are secured to the block 114. The manifold runners 66 and 78 for the manifold 61 and also joined to the block 114, as discussed above. It will be understood that both manifolds 61 and 81 are secured to the various blocks. However, the blocks do not provide for the joinder or communication between the manifolds 61 and 81. Rather, the blocks are divided functionally into two portions, an upper portion for the manifold 61 and a lower portion for the manifold 81. Thus each block includes two apertures, one communicating with the upper manifold and one communicating with the lower manifold, as well as the appropriate bores for the various manifold or grid elements or runners. This is best illustrated in FIGS. 6 and 9 and will be discussed below.

In FIG. 5, the parallel alignment of the manifolds 61 and 81 is illustrated, with the manifold runner 62 being disposed above and aligned with the manifold runner 82. The manifold runner 62 is shown with its aperture 64 facing upwardly, and the lower manifold runner 82 is shown with an aperture 84 extending or facing downwardly. The apertures 64 and 84 are thus 180° apart for sensing the two different pressures, one the total pressure of the airflow from a duct and the other static or lee side pressure.

In FIG. 6, the block 110 is shown, with the manifold runners 62 and 78 of the manifold 61 secured to the upper portion of the block, and the manifold runners 82 and 98 of the manifold 81 secured to the lower portion of the duct. Shown in phantom in FIG. 6 are the apertures 112 and 113 which provide communication with the respective manifolds 61 and 81 through the block 110.

It will be noted that the manifold runners 78 and 80 do not include separate apertures, such as the apertures 64, 68, 72, and 76 for the manifold runners 62, 66, 70, and 74, respectively. Rather, the apertures or holes for the manifold runners 78 and 80 extend through the blocks 114, 118, 130 and 134, respectively. As best illustrated in FIG. 2, all of the apertures, including the apertures in the manifold runners and in the blocks, are disposed in a geometric pattern and are thus evenly spaced apart with respect to the apparatus 10. That is, each of the holes or apertures is spaced apart equally from each other adjacent hole and is similarly equally spaced from the inside of the base 30, thus centering each aperture in equal area segments or portions within the base 30. It will also be noted that the runners 62, 66, and 72 are continuous, while the runners 78 and 80 are actually comprised of a plurality of segments extending between the various blocks. The runner 74 is comprised of two segments or portions. The corresponding runners for the manifold 81 are substantially identical.

As best shown in FIG. 4, the manifold runner 74 includes a centrally disposed block 150. The block 150 is shown in phantom in both FIGS. 2 and 4. The block 150 comprises a connection between the manifolds 61 and 81 and the meter 42 (see FIG. 1). The clock 150 includes two manifold connecting tubes, including an upper manifold connecting tube 152, also shown in phantom in FIG. 4, which extends from the block 150 to the meter 42. The connecting tube 152 extends from the upper manifold 61, while the lower manifold connecting tube, not shown, extends from the lower manifold 81. Both manifold connecting tubes extend from the block 150 to the meter 42. It will be understood that the block 150 is similar to the other blocks, as discussed above, in that the block includes two separate portions, one portion, the upper portion, for the upper manifold 61 and the other, lower portion, for the lower manifold 81. The block 150 thus communicates with the runner 74 of the manifold 71 and the parallel and aligned manifold runner, not shown, for the lower or static manifold 81.

For sensing a relatively high velocity or flow of air from a duct, the manifold or grid 60 is used without any additional elements. However, if the flow of air is relatively small, then a plate, such as the plate 160, is utilized. The plate 160 is disposed over the manifold 60, substantially as shown in FIGS. 1 and 2, on the air entering (or upstream or total pressure) side of the manifold or grid 60. Thus, for sensing the pressure of supply air, the plate 160 is disposed as shown in FIGS. 2, 3, 4, 5, and 6 adjacent to the manifold 61. For sensing the pressure of return air, the plate 160 is disposed adjacent to the manifold 81. For sensing return air, the manifold 81 becomes the total pressure manifold and the manifold 61 becomes the static pressure manifold. The plate 160 is thus disposed on the side of the grid or manifold that the air enters, the upstream side. The plate 160 may be appropriately secured to the manifold 60, by appropriate elements as shown in FIG. 3.

A plurality of fastening elements 162, which may be rivets, or the like, is used to secure a flexible element 164, such as a band, or the like, to the plate 160. As shown in FIG. 3, the plate 160 is disposed on top of the manifold 60, with the flexible element 164 extending below the manifold 60. The fastening element 164 extends between a pair of elements 162 and beneath portions of the manifold 60 to secure the plate 160 fixedly to the manifold 60.

The plate 160 includes a plurality of circular holes or apertures 170, 172, 174, 176, 178, . . . 200. The holes or apertures 170 . . . 200 are of a predetermined diameter and are disposed over the various apertures in the manifold runners and in the blocks. This is best shown in FIG. 2. This is also shown in FIGS. 4, 5, and 6.

The size of the apertures 170 . . . 200, or the cumulative area of the apertures 170 . . . 200 with respect to the total area of the plate 160 provides a proportional ratio that allows for the apparatus 10, and the meter 42, to be used with relatively small supply air flows or return air flows. The apparatus 10, using the plate 160 over the manifold 60, may thus be used to relatively accurately measure flows of supply and return air at relatively low flow rates. With respect to the prior art, it is extremely difficult to obtain accurate meter readings of low velocity air flows due to the very low velocity pressures generated. The instruments are usually not sensitive to low velocity or pressure differentials and the meter readings accordingly are generally inaccurate.

It will be noted that the openings 170 . . . 200 in the plate 160 are relatively large with respect to the size or diameter of the holes or apertures in the manifold 60. The relatively large holes in the plate 160 allow sufficient air to flow to provide a flow condition as opposed to a pressure condition since the purpose of the apparatus is to sense or to determine flow as opposed to pressure. The flow being measured through the apparatus 10 with the plate 160 in place is so low that the restriction of the flow by the plate 160 does not greatly hamper the flow itself. The pressure drop across the plate and the manifold or grid is still comparable to what it would be without the plate in place for the air quantity being measured for each of the conditions, namely relatively large airflows without the plate and relatively small airflows with the plate. Accordingly, appropriate calibration of the meter 42 with the plate 160 in place over the manifold 60 allows the apparatus 10 to accurately measure small air flows.

FIG. 7 is a top view of manifold or grid apparatus 300, which comprises an alternate embodiment of the manifold apparatus 60 of FIGS. 1-6. FIG. 8 is a view in partial section of the apparatus 300 taken generally along line 8—8 of FIG. 7. FIG. 9 is a view in partial section of a portion of the manifold apparatus 300 taken generally along line 9—9 of FIG. 8. FIG. 10 is a perspective view of a portion of the manifold apparatus 300. For the following discussion of manifold apparatus 300, reference will be made to FIGS. 7, 8, 9, and 10.

The manifold or grid apparatus 300 comprises an alternate embodiment of the manifold or grid apparatus 60. With the manifold or grid apparatus 300, there is a central manifold hub 302 with a plurality of manifold runners extending radially outwardly from the hub 302. The hub 302 comprises a dual hub, which includes two portions, an upper portion and a lower portion. The manifold apparatus 300, like the manifold apparatus 60, includes two separate manifolds, both of which are secured to the manifold hub 302. Both manifolds are disposed adjacent to each other and are generally aligned parallel to each other. The two manifolds include an upper manifold 306 for sensing the total pressure and a lower manifold 506 for sensing static pressure. The upper manifold 306 is shown in FIG. 7, and portions of the lower manifold 506 are shown in FIGS. 8 and 9. The two manifolds are separate, of course, and do not communicate with each other. However, as indicated above, and comparable to the manifold or grid portions 61 and 81 of the manifold 60, the manifolds 306 and 506 are aligned with each other and are disposed adjacent to each other. Both are connected to different portions of the manifold hub 302. The base 30 is shown in dotted line in FIG. 7 to show the general orientation of the grid 300 within the base.

A plurality of manifold runners extends radially outwardly from the hub 302. For the manifold 306, the radially extending manifold runners include a manifold runner 310, a manifold runner 340, a manifold runner 370, and a manifold runner 400. Four radially extending manifold runners for the lower manifold 506 also extend outwardly from the hub 302. In FIG. 9, a manifold runner 600 of the manifold 506 is shown.

The upper portion of the hub 302 is shown in perspective and is enlarged in FIG. 10. The connection of the four radially extending manifold runners 310, 340, 370, and 400 is shown. The manifold runners, which comprise hollow cylindrical tubes, as with the manifold runners of the manifold 60, discussed above, are aligned and communicate with a central chamber within the upper portion of the hub 302. A manifold connector tube 430 extends outwardly from the hub 302 to a meter, such as a meter 42. The connector tube or conduit 430 communicates with the hub 302, with the four radially extending manifold arms 310, 340, 370, and 400.

As indicated above, while a single hub 302 is used for both the upper manifold 306 and the lower manifold 506, there is no communication between the two manifolds within the hub 302. Rather, the hub 302 includes two separate portions, an upper portion, and a lower portion, to service each of the manifolds without intercommunication between them.

Each of the four radially extending manifold runners 310, 340, 370, and 400, is connected to runner arms at the distal portion of the radial runners through connector blocks. For the radial arm 310 there is a connector block 314 at its distal end, remote from the manifold hub 302. In turn, three runner arms 316, 322, and 328 are connected to the connector block 314. Thus, the radially extending manifold runner 310 is connected through the block 314 to the runner arms 316, 322, and 328.

The radial arm 310 includes an aperture 312 extending through the arm to provide pressure communication with the interior of the runner 310. The arm 316 includes an aperture 318 extending through it, to provide communication with the interior of the arm 316. Similarly, the arms 322 and 328 include apertures 324 and 330, respectively, which also provide pressure communication with the interior of the arms. The apertures 312, 318, 324, and 330 are spaced apart equidistant from each other. The ends of the arms 316, 322, and 328 are closed by caps 320, 326, 332, respectively.

The radial runner 340 includes an aperture 342. The aperture 342 provides pressure communication with the interior of the arm 340.

On the distal end of the runner 340, remote from the hub 302, is a connector block 344. Extending outwardly from the connector block 344 are three runner arms 346, 352, and 358. At the distal end of the three runner arms 346, 352, and 358 are caps 350, 356, and 362, respectively. Between the connector block 344 and the caps for the three arms 346, 352, and 358 are three apertures or holes 348, 354, and 360, respectively. The apertures 342, 348, 354 and 360 are spaced equidistant apart. The runner 340, with its three runner arms, is substantially identical to the arm 310 and its three runner arms in design and construction and also in the layout of the various apertures or holes.

The radially extending runner 370 is substantially identical to the runners 310 and 340. On the distal end of the runner 370, remote from the hub 302, is a connector block 374. Three runner arms 376, 382, 388, extend outwardly from the block 374. Each of the three runner arms 376, 382, 388, include a cap on their distal ends, remote from the connector block 374. The cap include a cap 380 for the arm 376, a cap 386 for the arm 382, and a cap 392 for the arm 388.

The four arm portions, including the runner 370 and its arms 376, 382, 388, each include an aperture or hole which extends through the respective runners to provide pressure communication with the interior of the arm elements. The apertures include an aperture 372 in the runner 370, an aperture 378 in the runner arm 376, an aperture 374 in the runner arm 382, and an aperture 390 in the runner arm 388. Like the arms 310 and 340, the apertures for the runner 370 and its runner arms are also spaced equidistant apart.

The manifold runner 400 is substantially identical to the other three manifold runners 310, 340, and 370. The runner 400 includes a connector block 404 at its distal end, remote from the hub 302. Three arms extend outwardly from the block 404. The arms include an arm 406, an arm 412, and an arm 418. The arm 406 includes an aperture or hole 408 and a cap 410. The arm 412 includes an aperture 414 and a cap 416. The arm 418 includes an aperture or hole 420 and a cap 422. The runner 400 includes an aperture or hole 402. The apertures 402, 408, 414, and 420 are also equally spaced apart from each other. The caps 410, 416, and 422 close the distal ends of the respective runner arms 406, 412, and 418.

From FIG. 7, it will be noted that the apertures in the various runners and arms are disposed in a regular pattern, with each aperture being equidistant from its adjacent aperture, and each aperture covers an equal area segment within the base 30, as discussed above for the manifold 60. The apertures are spaced apart so as to provide coverage over a square area. The base 30 of the airflow measurement apparatus 10 is shown in dotted line. The grid or manifold 300 is shown disposed within the base 30.

Each of the runner arms communicates with one of the four radial arms, and each of the radial arms communicates together within the hub 302. From the hub 302, a manifold connector tube 430 extends toward the base 30 and communicates with the meter 42.

It will be noted that the four radially extending arms are disposed 90° apart from adjacent arms, and that the three runner arms connected to each radially extending arm are also 90° from each other and from the radial arm to which the three runner arms pertain. The location of the holes or apertures which extend into the various arms are all aligned with each other and extend radially to provide direct communication with the interior of the various arms. This is best illustrated in FIG. 8.

The upper manifold 306 is shown in FIG. 7, and portions of both the upper, or total pressure, manifold 306 and the lower, or static, pressure manifold 506 are shown in FIGS. 8 and 9. In FIG. 8, a runner arm 546 is shown disposed beneath the runner arm 346. The runner arm 546 includes an aperture 548 which extends or faces downwardly, or 180° from the aperture 348 in the runner arm 346. It will be noted that each of the various runners and runner arms of the manifold 506 are aligned with and are parallel to, their respective manifold arms and/or runner arms. The holes and apertures face in opposite directions for the two manifolds, as with manifold 60. Thus, the apertures for the upper manifold 306 face upwardly, while the apertures for the lower or static manifold 506 extend downwardly. This may be seen best in FIG. 8, which shows aperture 348 facing upwardly and aperture 548 in runner arm 546 facing downwardly.

The cap 350 closes the distal ends of the manifold runner arms 346 and 546, as shown in FIGS. 7 and 8. It will thus be understood that the manifold caps provide end closures for sealingly closing the ends of the manifold runner arms for both the upper manifold and the lower manifold. This is similar to the manner in which the manifold hub 302 serves both the upper manifold 306 and the lower manifold 506.

In FIG. 9, the connector block 404 is shown connected to portions of both the upper manifold 406 and the lower manifold 506. The radially extending manifold runner 400 is shown extending into, and connected with, the block 404, and the runner arm 412 is shown extending outwardly from the block 404 and aligned with the runner 400.

Disposed beneath, and aligned with, the manifold elements 400 and 412 are two manifold elements 600 and 612 for the lower manifold 506. The manifold element 600 comprises a radially extending manifold runner for the lower manifold 506, and the manifold element 612 comprises a runner arm for the manifold runner 600. The bore for the runner arm 418 and the bore for a runner arm 618 are also shown in FIG. 9.

While the connector block 404, like the other connector blocks involved, serves both the upper, total pressure manifold 406 and the lower, static pressure manifold 506, there is no interconnection between the two manifolds. The manifolds, and the air flowing therethrough, and the hub 302 and outwardly from the hub 302 to the meter 42, are kept separate until they arrive at the meter 402 where the pressure differential is sensed and is altered or transformed by appropriate elements to indicate velocity or volumetric flow.

FIG. 10, which has been briefly discussed above, illustrates details of the connector block 302. The upper portion of the connector block 302, pertaining to the upper manifold 306, is shown. The connector block 302 is shown with all four of the runners 310, 340, 370, and 400 of the upper manifold 306. Two of the runners, the runner 310 and the runner 400, are shown connected to the hub 302. The runners 340 and 370 are shown spaced apart slightly from the hub 302. The connecting conduit 430, which extends from the hub 302 to the meter 42, is also shown connected to, and extending outwardly from, the hub 302.

Within the hub 302, and shown in phantom, are four radially extending and intersecting bores. The runners 310 . . . 400 connect with the bores, to provide the required pressure communication between the conduits in the runners 310 . . . 400 and the conduit 430. For ease of illustration, the runners 310 . . . 400 are shown connected to or aligned with the radially extending bores of the hub 302. It will be understood that the runners 310 . . . 400 actually extend into counterbores within the hub 302, and that the radially extending bores comprise continuations of the interior bores of the runners. Similarly, the connecting conduit 430 extends into a counterbore, with the interior bore of the conduit 430 comprising a continuation of another radially extending bore within the hub 302 for the conduit 430. The bore in the hub 302 for the conduit 430 also intersects the other bores for the runners 310 . . . 400 to provide communication between the runners and the conduit.

The employment of counterbores with the radial bores may be understood with reference to FIG. 9. Although FIG. 9 shows a connector block 404, the interconnection of the hub 302 with its runners is substantially the same as the interconnection between the block 404 and its runners. However, the hub 302 is illustrated as being circular or round, while the block 404, and the other three blocks 314, 344, and 374 are illustrated as being square. Obviously, the blocks 314 . . . 374 may also be round, if desired.

The lower portion of the hub 302, which pertains to the lower manifold 506, is substantially identical to the upper portion shown in FIG. 10. The various bores and counterbores of the lower portion are generally aligned with and are parallel to their corresponding bores and counterbores in the upper portion.

FIG. 11 is a top view of an alternate embodiment of the manifold apparatus or grid 300 of FIGS. 7-10. The alternate embodiment comprises manifold or grid apparatus 700, which is substantially identical in general function and general layout to the manifold 300 of FIGS. 7-10. The manifold or grid apparatus 700 is of a simplified construction, and comprises, generally speaking, a three-piece element.

Figure 12:
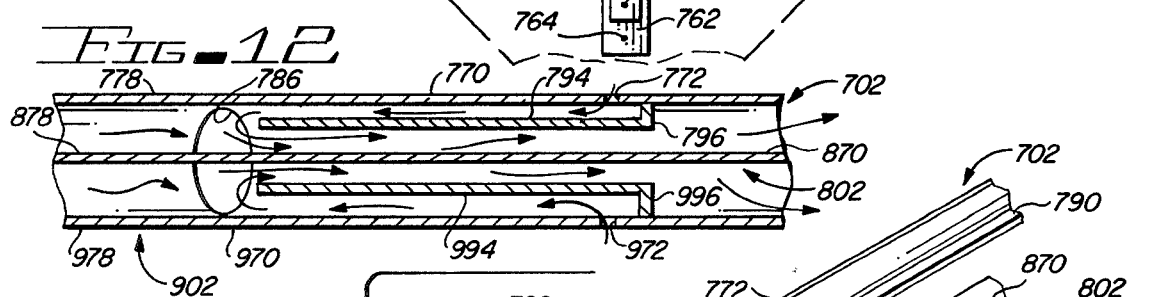
FIG. 12 is a view in partial section taken generally along line 12—12 of FIG. 11.
Figure 13:
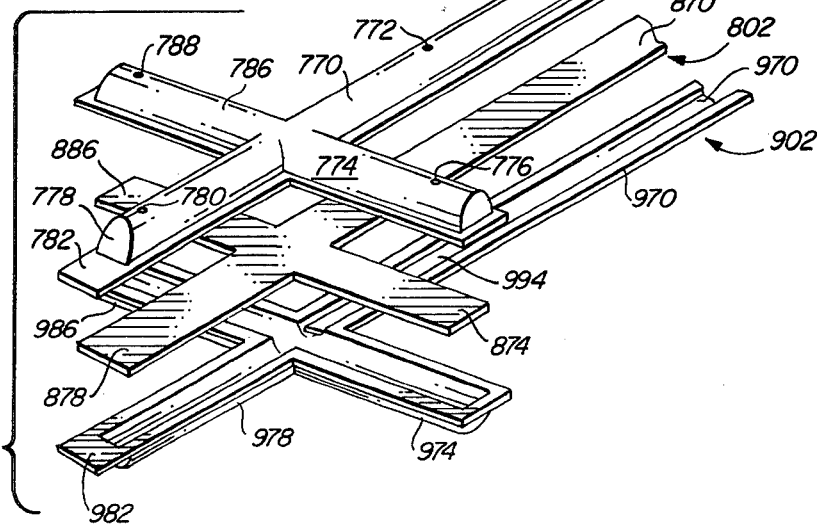
FIG. 13 is an exploded perspective view of a portion of the apparatus of FIGS. 11 and 12.

FIG. 12 is a view in partial section of a portion of the manifold apparatus 700 taken generally along line 12—12 of FIG. 11. FIG. 13 is an exploded perspective view of a portion of the manifold apparatus 700. The three piece construction of the manifold apparatus 700 is illustrated in FIG. 13. FIG. 14 is a view in partial section of a portion of the apparatus 700, taken generally along line 14—14 of FIG. 11. FIG. 14 illustrates the securing of the manifold apparatus 700 to the base 30. FIG. 15 is a view in partial section of a portion of the manifold apparatus 700 taken generally along line 15—15 of FIG. 11. For the following discussion concerning the manifold or grid apparatus 700, reference will be made to FIGS. 11, 12, 13, 14, and 15.

For convenience of manufacturing, the manifold or grid apparatus 700 is preferably molded in three pieces, an upper half 702, a lower half 902 (see FIGS. 12, 13, 14, and 15), and a center spacer element 802. The spacer element 802 comprises a separator plate or layer to keep the airflows and pressures in the upper half 702 and in the lower half 902 separate from each other. Portions of the separator plate 802 are shown in FIGS. 12, 13, 14, and 15. As may best be understood from FIGS. 12, 13, 14, and 15, both the upper half 702 and the lower half 902 comprise mirror images of each other, and both comprise generally concave elements with appropriate runners and arms which define conduits, the purpose of which is substantially identical to the conduits of the manifolds or grids discussed above in conjunction with FIGS. 1-10.

The upper half 702 of the manifold or grid element 700 includes a central hub 704 with four runners 710, 730, 750, and 770 extending radially outwardly from the hub. A connector conduit 706 also extends radially outwardly from the hub 704. At the distal end of the connector conduit 702 there is a relatively short connector tube 708. An appropriate flexible connector tubing extends from the connector tube 708 to the meter 42, substantially identical to appropriate connector tubing used in conjunction with the manifolds or grids 60 and 300 and the meter 42.

The runner 710 includes three runner arms 714, 718, and 726. The runner 710 includes an aperture or hole 712, and the arms 714, 718, and 726 each include a hole or aperture 716, 720, and 728, respectively. The holes or apertures 712, 716, 720, and 728 provide pressure communication from the exterior of the upper portions of the manifold or grid 702 to the interior conduit portions thereof.

The arm 718 is aligned with runner 710, and the arms 714 and 726 are aligned with each other and are substantially perpendicular to the runner 710 and the arm 718. At the distal end of the runner 718 is an outwardly extending tab 722. The tab 722 includes a hole or aperture 724, which may be tapped, for receiving an appropriate fastening element to secure the manifold 700 within the base 30. The base 30 is outlined in dotted line in FIG. 11.

The runner 730 extends radially outwardly from the hub 704 and it includes, at its distal end, three arms 734, 738, and 746. The arms each include an aperture, as does the runner 730. The runner 730 includes a hole or aperture 732, and the arms 734, 738, and 746 include, respectively, holes or apertures 736, 740, and 748.

The arm 738 is aligned with the runner 730, and the arms 734 and 746 are aligned with each other and are substantially perpendicular to the aligned runner 730 and the arm 738.

Extending outwardly from the distal end of the arm 738 is a tab 742. The tab 742 includes an aperture or hole 744, which is substantially identical to the aperture or hole 724 on the tab 742.

The runner 750 is also connected, at its distal end, to three arms 754, 758, and 766. The arm 758 is aligned with the runner 750, and the arms 754 and 766 are aligned with each other and are substantially perpendicular to the runner 750 and the arm 758. The runner 750 includes a hole or aperture 752, and the arms 754, 758, and 766 each include a hole or aperture, identified respectively by reference numerals 756, 760, and 768.

A tab 762 extends outwardly from the distal end of the arm 758. A hole or aperture 764 extends through the tab 762.

The runner 770 also includes three arms, namely an arm 774, an arm 778, and an arm 786. A hole 772 extends through the arm 770, and holes 776, 780, and 788 extend respectively through the arms 774, 778, and 786. The arm 778 is aligned with the runner 770, and the arms 774 and 786 are aligned with each other and are substantially perpendicular to the runner 770 and the arm 778.

The arm 778 includes, at its distal end, a tab 782. A hole or aperture 784 extends through the tab 782.

The runners 730 and 770 are aligned with each other, as are the arms 710 and 750. The arms 730 and 770 are substantially perpendicular to the aligned arms 710 and 750.

As may be best understood from FIG. 11, the manifold or grid apparatus 700 is disposed within the base 30. The four tabs 722, 742, 762, and 782 extend toward the corners of the base 30. The connector conduit 706 extends toward the center or middle of one of the sides of the base 730 for appropriate connection to the meter 742.

The bottom half manifold 902 is substantially a mirror image of the upper half 702, and may be molded in the same mold. The various corresponding elements of the manifold 902 have similar reference numerals, except that in the manifold 902 the reference numerals are in the 900's instead of the 700's as in the manifold 702. The spacer or separator element or plate 802 is disposed between the upper half 702 and the lower half 902 during the assembly process. The separator element or plate 802 is flat. It is in the same general configuration as the upper and lower halves and is disposed therebetween. In assembly, an appropriate solvent may be utilized to secure by solvent welding the two halves together, with the separator element 802 therebetween. The separator plate 802, of course, prevents direct communication between the upper half or manifold 702 and the lower half or manifold 902. The various elements of the separator plate 802 correspond to the runners and runner arms of the upper and lower manifolds. The reference numerals for the separator plate 802 correlate with those of the two manifolds, and are in the 800's or between the 700's of the manifold 702 and the 900's of the manifold 902.

The holes or apertures on the various runners or arms are equally spaced apart and each is disposed in an equal area segment throughout the cross-sectional area of the base 30. This is substantially identical to the orientation of the holes or apertures discussed above in conjunction with the manifolds or grid elements 60 and 300.

It will be noted that the holes or apertures 712, 732, 752, and 772 are closer to the hub 704 with regard to conduit length than are the holes in the runner arms. It will be noted also that the holes in the runner arms are equally spaced apart from the hub element 704. In order to provide the same conduit length from the holes 712, 732, 752, and 772 to the hub 704 as is inherent from the location of the holes in the runner arms, a baffle plate and an end wall are inserted in each of the runners adjacent to the respective holes 712 . . . 772. This is best shown in FIG. 12, and is also shown in FIG. 13.

FIG. 12, which comprises a view in partial section through runners 770 and 970 of the upper manifold half 702 and the lower manifold half 902, respectively, and through a runner portion 870 and an arm portion 878 of the spacer or separator plate 802, shows a baffle 794 and an end plate 796 disposed within the arm 770 and adjacent to the hole or aperture 772. Similarly, a baffle 994 and an end plate 996 are disposed within the runner 970 adjacent to a hole 972.

The end plate 796 is disposed between the hole 772 and the hub 704. The baffle 794 extends from the end plate 796 toward the juncture of the three runner arms 774, 778, and 786 (see also FIG. 11) so that the conduit distance from the hole 772 to the hub is the same as the conduit distance from the other three holes in the arms of the runner 770 to the hub 704, thus providing equal conduit distance from each of the four holes to the hub. Similarly, the baffle 994 and end plate 996 provide equal conduit distance from each of the four holes connected with the runner 970 and its arms to the corresponding hub (not shown) for the lower manifold 902.

In FIG. 13, the runners 770 and 970, of the upper and lower manifold halves 702 and 902, respectively, are shown. Their respective three runner arms 774, 778, and 786 and 974, 978, and 986 are also shown. Portions of the separator plate 802 are shown disposed between the upper manifold 702 and the lower manifold 902. The portions of the separator plate 802 shown in FIG. 13 include a runner portion 870, and its three arm portions 874, 878, and 886. The arm portions 874 . . . 886 and the runner portion 870 are adapted to be disposed between the corresponding runner and arm portions of the upper and lower halves 702 and 902, respectively of the manifold apparatus 700. The baffle 994 is also shown in FIG. 13.

The baffles and end plates are also appropriately solvent welded to the runners. The solvent welding of the baffles and end plates, of course, occurs prior to the assembly of the upper and lower halves and the separator plate.

The securing of the manifold or grid apparatus 700 within the base 30 is illustrated in FIG. 14. A portion of the manifold 702 and the manifold 902, with a portion of the separator plate 802, is shown in FIG. 14. The distal end of the arm 838 of the separator element 802 is shown disposed between the arm portions of the upper and lower manifolds. It will be noted that the arm portion 838 of the separator plate 802 appears to be disposed within mating recesses on the upper and lower manifolds. This is a preferred assembly technique, with the recesses extending around the full inner periphery of the upper and lower manifold halves to receive the separator plate 802.

A spring element 1004 is shown extending between the tabs 742 and 942 and the base 30. The spring element 1004 is appropriately secured to both the base 30 and to the tabs 742 and 942. The tabs 742 and 942 include mating and aligned apertures or hole for receiving an appropriate fastening element. As illustrated in FIG. 14, an appropriate fastening element, which may be a screw 1006, secures one end of the spring 1004 to the tabs 742 and 942. A similar screw element may also be used to secure the other end of the spring element 1004 to the base 30.

Referring again primarily to FIG. 11, it will be noted that an outwardly extending exterior flange or lip 790 extends on the outer periphery of the upper manifold 702. A corresponding and mating lip 990 extends about the periphery of the lower manifold 902, as may be inferred from FIG. 15. The upper and lower manifolds 702 and 902, respectively, are preferably solvent welded at the lips 790 and 990. The spacer or separator element 802 is disposed within mating recesses on the interior periphery of the upper and lower manifolds and is aligned with the lip elements 790 and 990. This is best shown in FIGS. 14 and 15.

Portions of the outer lip 790 are useful for securing plate apparatus to the manifold 700 for measuring low airflows. Shown in dotted line in FIG. 11 are five plates or plate portions. The plate portions include a plate portion 1020, a plate portion 1022, a plate portion 1024, and plate portions 1026 and 1028. The plate portions 1020, 1022, and 1024 are generally rectangularly or squarely shaped elements, while the plate portions 1026 and 1028 are generally triangularly shaped elements. All five of the plate elements are disposed on the lip areas between the hub 704 and the runner arms.

The plate element 1020 extends outwardly from the hub 704 between the runners 710 and 730 and outwardly to the runner arms 726 and 734. The plate element 1022 extends outwardly from the hub 704 between the runners 730 and 750 and to the runner arms 746 and 754. The plate element 1024 extends outwardly from the hub 704 between the arms 750 and 770 and to the runner arms 766 and 774. The plate portion 1020, 1022, and 1024 thus occupy the relatively square area outwardly from the hub 704 to the runner arms of the runners 710, 730, 750, and 770.

The two triangular plate portions 1026 and 1028 together generally occupy the area between the runners 710 and 770 and the runner arms 714 and 786, respectively. The connector conduit 706 extends between the runner arms 710 and 770, and the plate elements 1026 and 1028 occupy the area between the runners 770 and 710 and the connector conduit 706, respectively. The plate element 1026 extends between the connector conduit 706 and the runner 770 and the arm 786, while the plate element 1028 extends between the connector conduit 706 and the runner 710 and arm 714.

In overall configuration, the five plate elements occupy a relatively square area within the base 30. The five plate elements perform substantially the same function for low airflows as does the baffle plate 160 discussed above in conjunction with the manifold apparatus 60 of FIGS. 1-6. The purpose of the plate apparatus is to provide a multiplication factor for measuring low airflows.

An advantage of the five plates 1020 . . . 1028 for the manifold apparatus 700 over the plate 160 is that the plate elements are disposed on the manifold apparatus by appropriate fastening elements, not shown, but need not be placed on the upstream or air entering side of the manifold apparatus. Thus, they may be placed as convenient without concern for whether they are disposed on the air entering or upstream side of the manifold 700 or on the downstream side.

FIG. 16 is a top view of an embodiment of plate apparatus usable with the manifolds 60, 300, and 700 for measuring low airflows. FIG. 17 is a top view of an alternate embodiment of plate apparatus of FIG. 16 also usable with the manifolds 60, 300, and 700 for measuring low airflows. In FIGS. 16 and 17, the interior of the base 30 is schematically illustrated, as is the manifold 700.

In FIG. 16, a plate 1050 is shown disposed over the center portion of the manifold apparatus 700. The plate 1050 is of a generally square configuration and is disposed over the center portion of the manifold 700, namely over the runners which extend radially outwardly from the manifold hub 704.

The plate 1050 includes four holes or apertures 1052, 1054, 1056, and 1058. The holes or apertures 1052 . . . 1058 are aligned, and are disposed coaxially, with the holes in the manifold runners over which the plate 1050 is oriented. The holes 1052 . . . 1058 are, as with the holes in the plate 160, substantially larger than the corresponding and aligned holes in the manifold runners.

It will be noted that the plate 1050 occupies only a portion of the general area within the base 30. Thus, the airflow through the base 30 outwardly from the plate 1050 is relatively unimpaired. As with the plate 160, the pressure drop through the base 30 due to the plate 1050 is negligible, but a multiplication factor is provided by using the plate 1050 whereby relatively small airflows may be measured.

An alternate embodiment of the plate 1050 is shown schematically in FIG. 17. While the plate 1050 occupies the center portion of the area within the base 30, a plate 1070 is shown in FIG. 17 occupying the outer portion of the area within the base 30. The plate 1070 is generally in a configuration of a rectangular donut. Twelve holes or apertures 1072, 1074, 1076, 1078, 1080, 1082, 1084, 1086, 1088, 1090, 1092, and 1094 extend through the plate 1070. The holes 1072 . . . 1094 are coaxially aligned with corresponding holes in the runner arms of the manifold apparatus 700. As with the holes 1052 . . . 1085, and the holes in the plate 160, the holes 1072 . . . 1094 are substantially larger in diameter than are their corresponding holes in the manifold runner arms.

The open area of the plate 1070 comprises a square area in the center of the base 30 and over the runners of the manifold apparatus 700. As with the plate 1050 and the plate 160, the pressure drop due to the plate 1070 is substantially negligible, but a multiplication factor is provided which allows the relatively accurate measurement of small airflows.

FIG. 18 is a front view of a portion of the meter 42, showing the two general portions of the meter. A selector switch 44 is shown disposed above a meter face 50. The selector switch 44 may be used to select a particular desired range of flows. Three ranges are substantially shown on each side of the switch 44.

An arrow 46 is shown on the right side of the switch 44. The arrow 46 points downwardly and represents the direction of airflow for the three measurement ranges schematically shown adjacent to it. The arrow 46 represents the general direction of airflow for the total pressure discussed above for the manifolds 60, 300, and 700. That is, the upper manifold portions, sensing total pressure, are on the air entering or upstream side of the apparatus 10 when airflow is in the direction corresponding to the arrow 46.

For measuring return flows, the selector switch 44 may be turned to any of the ranges schematically shown adjacent to the arrow 48. For airflow in the direction of arrow 48, a "lower" manifold, discussed above as sensing static (or lee side) pressure, becomes the total pressure sensing manifold. An "upper" manifold, discussed above as sensing total pressure, becomes the static pressure sensing manifold.

The meter face 50 includes a movable indicator needle, scales, etc. The needle moves in response to the airflow sensed by the total pressure of an "upper" or upstream, manifold after compensation for the static pressure sensed by a downstream manifold. On the meter face 50 are appropriate scales which correspond to the ranges selectable by the selector switch 44.

The selector switch 44 is appropriately connected to the two connecting conduits from the manifold apparatus within the base 30 and to appropriate elements which transduce the sensed pressures to provide a visual indication of airflow on the meter 50.

The flow indicated on the meter face 50 reflects the calibration for the instrument in accordance with the pressure differential sensed between the pressures of the flow of air through the base 30, utilizing an upper or upstream manifold to sense the total pressure of the flow of air and a lower or downstream manifold to sense the static pressure. The pressure differential between the two pressures sensed is appropriately transduced to indicate a flow rate indicated by the movable needle by the meter 50.

The manifolds or grids discussed herein are conduits disposed in a controlled airflow through a base and a funnel. The manifolds or grids include apertures or holes which provide communication between the airflow and the interior of the conduits. Two manifolds, parallel to each other, are connected to the meter 42. Except at the meter, the conduits are separate.

What is claimed is:

1. Manifold apparatus for sensing a pressure differential in an airflow, comprising, in combination:
   first manifold means for sensing total pressure in the airflow, including
     first manifold hub means,
     a first plurality of manifold runners secured to the manifold hub means and extending outwardly therefrom,
     a first plurality of runner arms connected to the plurality of manifold runners,
     a first plurality of apertures extending through the first plurality of manifold runners and the first plurality of runner arms for providing communication between the airflow total pressure and the respective manifold runners and runner arms, and
     a first manifold connector conduit connected to the first manifold hub means and communicating with the first plurality of manifold runners and manifold arms;
   second manifold means for sensing airflow static pressure, including
     second manifold hub means,
     a second plurality of manifold runners secured to the second manifold hub means and extending outwardly therefrom,
     a second plurality of runner arms connected to the second plurality of manifold runners,
     a second plurality of apertures extending through the second plurality of manifold runners and the second plurality of runner arms for providing communication between the airflow static air pressure and the respective manifold runners and runner arms, and
     a second manifold connector conduit connected to the second manifold hub means and communicating with the second plurality of manifold runners and manifold arms; and
   meter means connected to the first and second manifold connector conduits for providing an indication of the airflow.

2. The apparatus of claim 1 in which the first and second manifold means are disposed adjacent to each other and are substantially parallel to each other.

3. The apparatus of claim 2 in which the first and second pluralities of apertures are generally aligned with each other and face substantially 180° apart from each other.

4. The apparatus of claim 1 in which the first and second pluralities of manifold runners extend radially outwardly from the first and second manifold hub means, respectively.

5. The apparatus of claim 1 in which the apertures of the first plurality of apertures are spaced apart equidistant from each other, and the apertures of the second plurality of apertures are spaced apart equidistant from each other.

6. The apparatus of claim 1 in which the first manifold means comprises a first manifold half, and the second manifold means comprises a second manifold half, and the apparatus further includes a separator plate disposed between the first and second manifold halves to separate the pressure flows therein.

7. The apparatus of claim 6 in which the first and second manifold halves further comprise mirror images of each other.

8. The apparatus of claim 6 in which the first and second manifold means further include means for securing the manifold apparatus within the airflow.

9. The apparatus of claim 1 in which each manifold runner includes baffle means for equalizing the distance from the apertures in the runner arms to the hub means and the distance from the apertures in the manifold runners to the hub means.

10. The apparatus of claim 1 which further includes plate means blocking the airflow past the first and second manifold means for providing a multiplication factor of the total pressure of the airflow for measuring a relatively small airflow.

11. The apparatus of claim 10 in which the plate means includes
    a plate, and
    a plurality of openings in the plate coaxially aligned with at least some of the first and second pluralities of apertures.

12. The apparatus of claim 11 in which each opening of the plurality of openings is substantially larger than each aperture.

13. Manifold apparatus for sensing a pressure differential in a relatively small airflow, comprising, in combination
    first manifold means for sensing total pressure in the airflow, including
      a first plurality of conduits, and
      a first plurality of apertures in the first plurality of conduits;
    second manifold means for sensing static pressure in the airflow, including
      a second plurality of conduits, and
      a second plurality of apertures in the second plurality of conduits;
    plate means disposed adjacent to the first manifold means for blocking at least a portion of the airflow by the manifold apparatus for providing a multiplication factor for the total pressure of the airflow.

14. The apparatus of claim 13 in which the plate means includes a plurality of holes disposed coaxially with at least some of the first plurality of apertures.

15. The apparatus of claim 13 in which the diameter of each hole is substantially greater than the diameter of each aperture.

16. Plate means for flow sensing apparatus having a manifold apparatus disposed in a flow of air and a plurality of apertures in the manifold apparatus through which air flows into the manifold, comprising the combination of:
    plate means securable to the manifold apparatus for limiting the flow of air over the manifold apparatus; and
    a plurality of openings having a predetermined area in the plate means for directing the limited flow of air over the manifold apparatus for sensing relatively low air flows.

17. The apparatus of claim 16 in which the plurality of openings are disposed over the plurality of apertures in the manifold apparatus.

18. The apparatus of claim 16 in which the plate means comprises a relatively square plate adapted to be disposed generally over the center of the manifold apparatus.

19. The apparatus of claim 16 in which the plate means comprises a generally square plate having a generally square opening in the center of the plate and the plate is adapted to be disposed generally over the outer portion of the manifold apparatus.

20. The apparatus of claim 5 in which the first manifold means further includes first baffle means disposed in the first plurality of manifold runners adjacent to apertures of the first plurality of apertures in the first plurality of manifold runners to provide the same distance to the first manifold hub means for the airflow from each aperture of the first plurality of apertures.

21. The apparatus of claim 20 in which the second manifold means further includes second baffle means disposed in the second plurality of manifold runners adjacent to apertures of the second plurality of apertures in the second plurality of manifold runners to provide the same distance to the second manifold hub means for the airflow from each aperture of the second plurality of apertures.

* * * * *